UNITED STATES PATENT OFFICE 2,396,201

PRODUCTION OF ACETYL CYANIDE

Gardner C. Ray, Bartlesville, Okla., assignor to Phillips Petroleum Company, a corporation of Delaware No Drawing. Application July 1, 1944, Serial No. 543,213

4 Claims. (Cl. 260—464)

The present invention relates to the production of acetyl cyanide and lactonitrile, which are intermediates for the production of acrylonitrile.

Acetyl cyanide (propanone nitrile, pyruvonitrile or pyruvic acid nitrile, $CH_3CO-CN$) has heretofore been prepared by heating acetyl chloride and silver cyanide in a sealed tube at 100° C. (Hübner, Annalen, 1862, vol. 120, page 334) and by heating together isonitrosoacetone and acetyl chloride (Claisen and Manasse, Berichte, 1887, vol. 20, page 2196). Neither of these methods, which are the only known methods of preparation, is adaptable to industrial production of the compound at low cost.

Acetyl cyanide, as hereinafter disclosed more fully, may be converted by hydrogenation to lactonitrile (alpha-hydroxypropionitrile, 2-propanol-1-nitrile, acetaldehyde cyanohydrin,

$CH_3-CHOH-CN$), which is a starting material for the production of acrylonitrile. A cheap source of acetyl cyanide is eminently desirable, since it is a substance of considerable potential commercial interest, particularly as an intermediate for the synthesis of acrylonitrile, as well as for other substances.

It is the principal object of the present invention to provide a process for the production of acetyl cyanide at low cost. As more fully disclosed hereinafter, the compound may be prepared from ketene and hydrogen cyanide.

Another object of the invention is to provide a catalyst for the reaction of ketene and hydrogen cyanide to produce acetyl cyanide.

Another object of the invention is to provide a process which is capable of producing optimum yields of acetyl cyanide by the reaction of ketene and hydrogen cyanide.

Still another object of the invention is to provide a process for the hydrogenation of acetyl cyanide to lactonitrile.

Other objects and advantages of the invention, some of which are referred to specifically hereinafter, will be apparent to those skilled in the art to which the invention pertains.

Acetyl cyanide is the expected product of the reaction of ketene and hydrogen cyanide, in accordance with the following equation:

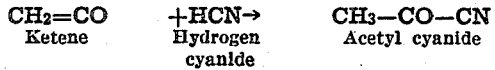

| $CH_2=CO$ | $+HCN \rightarrow$ | $CH_3-CO-CN$ |
| Ketene | Hydrogen cyanide | Acetyl cyanide | but all known attempts to prepare the compound by said reaction have resulted in failure (See Deakin and Wilsmore, J. Chem. Soc. (London), 1910, vol. 97, pages 1968 to 1978). The product that was obtained when ketene and hydrogen cyanide were reacted was definitely not acetyl cyanide but was presumed to be alpha-acetoxyacrylonitrile ($CH_3-CO-O-C(CN)=CH_2$). The method used for the preparation of said latter compound consisted briefly in distilling 15 to 20 cc. of ketene into an exhausted bomb tube cooled in liquid air. About twice this quantity of anhydrous hydrocyanic acid was added, and the tube was then sealed off. The tube was then shaken to mix the two reactants and allowed to warm up to room temperature. The tube was then cooled to −78° C., opened and the contents allowed to melt and warm up to room temperature. The product was purified by fractional distillation at subatmospheric pressure in hydrogen and had a boiling point of 110.0° to 110.4° C. at a pressure of 100 mm. of mercury.

Acetyl cyanide, in accordance with the process of the invention, is prepared by passing ketene and hydrogen cyanide in approximately equimolecular proportions in vapor phase at a subatmospheric pressure and at a temperature within the range of approximately 200° to approximately 400° C. over a porous surface-active material such as activated charcoal, pumice, and the like at a flow rate such that a contact period within the range of approximately 0.1 to 1 second is maintained. Subatmospheric pressures may be obtained by dilution of the reactants with an inert gas such as nitrogen, methane or the like. A preferred reactant mixture is one containing equimolecular proportions of ketene and hydrogen cyanide together with a volume of nitrogen equal to the volume of reactants so that the respective partial pressures of the constituents are ketene, 0.25 atmosphere; hydrogen cyanide, 0.25 atmosphere; and nitrogen, 0.50 atmosphere. The effluent product is quenched rapidly, preferably to approximately subatmospheric temperatures, by means of a refrigerated coil, and is separated and purified by fractional distillation. A substantial yield of acetyl cyanide may be obtained.

Ketene, which is used in the production of acetyl cyanide, may be obtained in any of the conventional manners, namely, by pyrolysis of acetone, acetic acid, acetic anhydride or other known substances. Such methods of preparation of ketene are described by Deakin and Wilsmore, loc. cit.; Peytral, Compt. rend., 1931, vol. 193, pages 1199 to 1200, and in various patents.

Activated charcoal, and other surface-active materials, preferably such as are not primarily materials which favor hydrogenation, dehydrogenation or dehydration reactions, may be used as catalysts for the production of acetyl cyanide from ketene and hydrogen cyanide.

Acetyl cyanide may be converted to lactonitrile by hydrogenation. In accordance with the preferred process of my invention, a mixture of acetyl cyanide and hydrogen gas is passed in vapor phase over an active hydrogenation catalyst, such as nickel, cobalt, platinum, and similar metals, preferably in finely divided form and supported on a substantially inert catalyst carrier, at a temperature within the range of from approximately 200° to approximately 250° C.

Conversion of lactonitrile to acrylonitrile may be accomplished by liquid-phase dehydration with acetic anhydride or other active dehydrating reagent. However, other known methods which are better adapted to industrial production may be used. Such methods are described, for example, in Erlenmeyer, Annalen, 1878, vol 191, page 269; Reppe and Hoffman, U. S. Patent No. 1,891,055; German Patent No. 496,372; and Spence and Mitchell, German Patent No. 725,277.

An example of the preferred methods of preparing acetyl cyanide and conversion of said compound to lactonitrile is as follows:

*Exemplary preparation of acetyl cyanide*

Ketene preheated to approximately 300° C. is mixed with hydrogen cyanide preheated to approximately 300° C. in approximately equimolecular ratio. Nitrogen preheated to a temperature of approximately 300° C. is then mixed with the ketene and hydrogen cyanide in approximately equal volume and the combined stream is passed through a tube filled with a granular carbon catalyst having a size of 8 to 10 mesh that is maintained at a temperature of approximately 350° C. The flow rate of the gaseous mixture is so adjusted that the contact period of the reactants is approximately 0.5 second.

The effluent product is quenched rapidly in a refrigerated coil and the products are thereafter fractionally distilled to separate unreacted ketene, hydrogen cyanide, acetyl cyanide and polymers.

Pure acetyl cyanide has a boiling point of approximately 93° C. A substantial yield of acetyl cyanide may be obtained.

The acetyl cyanide may be hydrogenated to lactonitrile as follows:

*Exemplary preparation of lactonitrile*

Acetyl cyanide is vaporized in a flask immersed in a water bath and the vapors are mixed with hydrogen in a molecular ratio of approximately 1:1. The mixture is preheated to approximately 150° C. and passed over a bed of a reduced nickel catalyst supported on kieselguhr granules having a size of 8 to 10 mesh contained in a steel tube having a length of 30 cm. and an internal diameter of 2 cm. that is maintained at a temperature of approximately 200° to 225° C. The effluent from the tube is condensed in an ice-cooled trap and fractionally distilled. A substantial yield of lactonitrile together with a smaller proportion of propionitrile may be obtained.

Inasmuch as the foregoing specification comprises preferred embodiments of the invention, it is to be understood that the invention is not limited thereto and that modification and variations may be made therein without departing substantially from the scope of the appended claims.

I claim:

1. A process for the production of acetyl cyanide which comprises contacting ketene and hydrogen cyanide in the vapor phase at a temperature within the range of approximately 200° to approximately 400° C. with a surface-active material.

2. A process for the production of acetyl cyanide which comprises contacting ketene and hydrogen cyanide in the vapor phase at a temperature within the range of approximately 200° to approximately 400° C. with a catalyst selected from the group consisting of activated carbons and pumice at such a flow rate that the period of contact with the catalyst is within the range of approximately 0.1 to approximately 1.0 second.

3. A process for the production of acetyl cyanide which comprises passing ketene and hydrogen cyanide in approximately equimolecular proportions and in admixture with a substantially inert gas into contact with a granular carbon catalyst at a temperature of approximately 350° C. at such a flow rate that the period of contact of the reactants with the catalyst is approximately 0.5 second, and recovering acetyl cyanide from the product.

4. A process for the production of acetyl cyanide which comprises passing ketene, hydrogen cyanide and nitrogen in molecular proportions of approximately 1:1:2 respectively, into contact with a granular carbon catalyst, at a temperature of approximately 350° C. at such a rate of flow that the reactants are in contact with the catalyst for a period of approximately 0.5 second, and recovering acetyl cyanide from the product.

GARDNER C. RAY.